Nov. 21, 1961 C. F. GREINER 3,009,401
PRESSURE CONTROL MEANS FOR ROAD ROLLERS
Filed Sept. 10, 1956 7 Sheets-Sheet 1

INVENTOR
Carl F. Greiner
BY
ATTORNEYS

Nov. 21, 1961 C. F. GREINER 3,009,401
PRESSURE CONTROL MEANS FOR ROAD ROLLERS
Filed Sept. 10, 1956 7 Sheets-Sheet 2
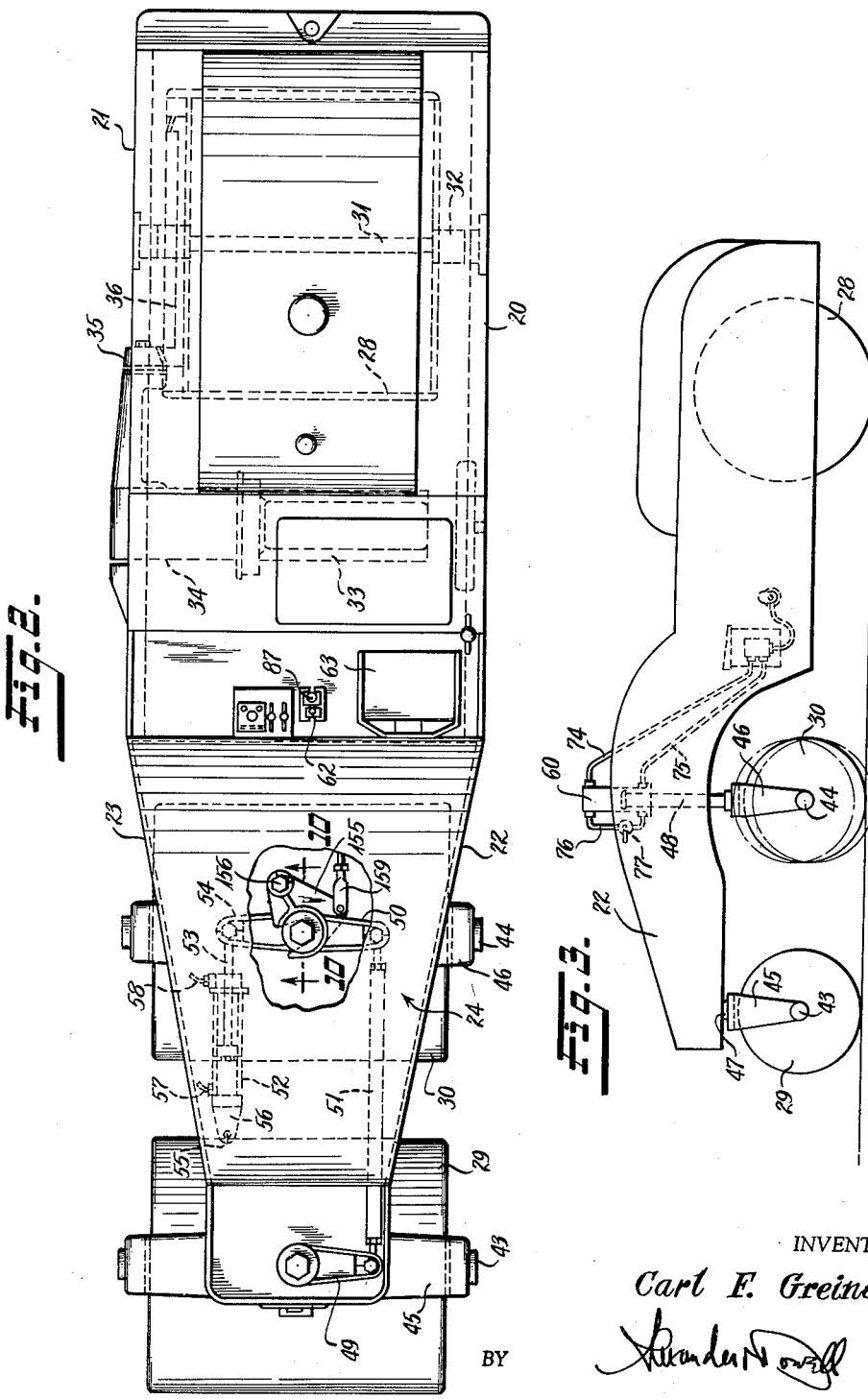
INVENTOR
Carl F. Greiner
BY
ATTORNEYS INVENTOR
Carl F. Greiner
BY
ATTORNEYS Nov. 21, 1961     C. F. GREINER     3,009,401
PRESSURE CONTROL MEANS FOR ROAD ROLLERS
Filed Sept. 10, 1956     7 Sheets-Sheet 4

INVENTOR
Carl F. Greiner
BY
ATTORNEYS

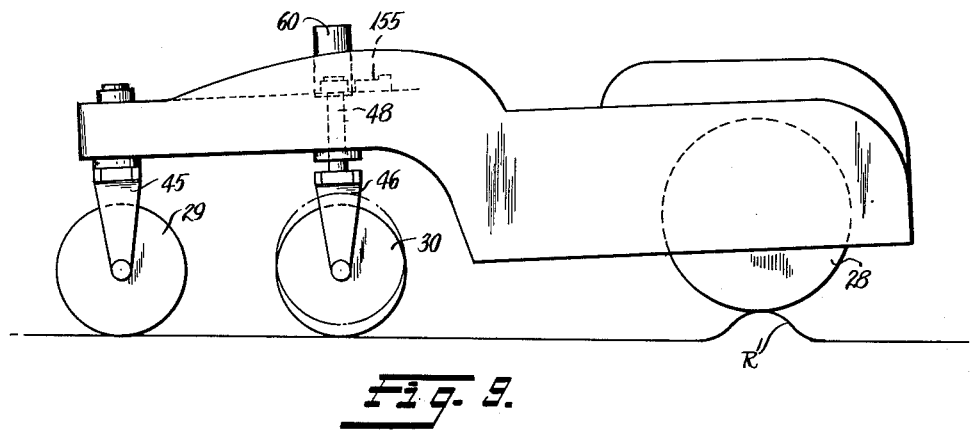
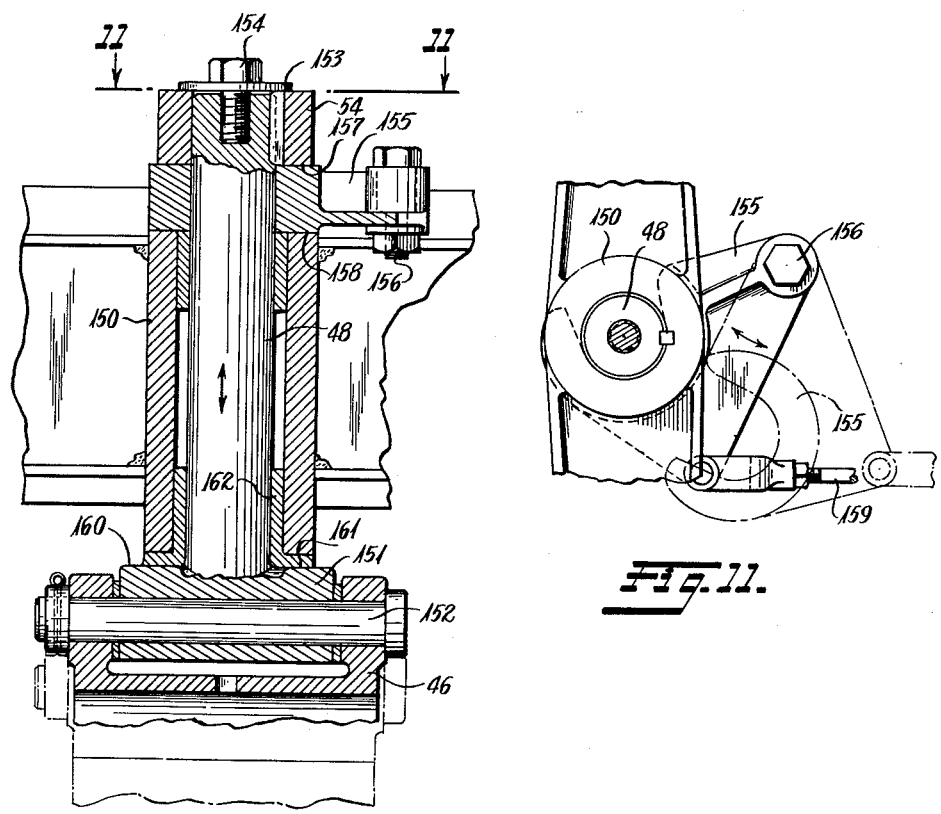

Nov. 21, 1961  C. F. GREINER  3,009,401
PRESSURE CONTROL MEANS FOR ROAD ROLLERS
Filed Sept. 10, 1956  7 Sheets-Sheet 6

INVENTOR.
Carl F. Greiner
BY
ATTORNEYS

Nov. 21, 1961   C. F. GREINER   3,009,401
PRESSURE CONTROL MEANS FOR ROAD ROLLERS
Filed Sept. 10, 1956   7 Sheets-Sheet 7

INVENTOR.
*Carl F. Greiner*
BY
ATTORNEYS

United States Patent Office 3,009,401
Patented Nov. 21, 1961

3,009,401
PRESSURE CONTROL MEANS FOR
ROAD ROLLERS
Carl F. Greiner, Springfield, Ohio, assignor, by mesne assignments, to Koehring Company, Milwaukee, Wis., a corporation of Wisconsin
Filed Sept. 10, 1956, Ser. No. 608,945
11 Claims. (Cl. 94—50)

This invention relates to a novel means for controlling the pressures applied by the several rolls of a road roller to the surface being rolled.

The present application is a continuation-in-part of my copending application Serial No. 290,183, filed May 27, 1952 and now patent No. 2,775,925, which discloses a three-axle tandem road roller provided with a horizontally pivoted walking beam at one end of the frame carrying one or both of the steering rolls, the other end of the frame being supported by the power driven drive roll, with means for simultaneously steering the two steering rolls, and pressure operated means for pivoting or raising or lowering the said walking beam in such manner as to control the pressures applied to the ground by the several rolls of the road roller in various ways in order to best adapt the machine to the particular material being compacted so that maximum densification of the material may be achieved with the fewest number of passes of the road roller.

In the three-axle machine disclosed in U.S. Patent No. 2,132,059 issued October 4, 1938, to George E. Trembly, it is possible to establish different relative elevations of the axles of the three-axle roller so that the rolls may be made to follow any desired road contour, that is, either a flat surface, a concave surface, or a convex surface. It is also possible, in the Trembly machine, to cause different pressures to be applied by the several rolls thereof to the road surface by selectively elevating either the center roll or one of the end rolls off the ground to thereby alter the distribution of weight upon the rolls. This expedient, however, enables only two optional pressure distributions to be effected, neither of which may fully satisfy the pressure requirements of the particular material being rolled.

In my aforesaid copending application Serial No. 290,183, in order to overcome this difficulty and to provide for an unlimited number of different pressure distributions on the rolls of a tandem road roller having three or more axles, I devised novel means for determining and controlling the pressure which may be applied by each of the several rolls of the machine to the surface over which the roller operates. Thus, the initial pass of a roll might be made with the exact pressure required for best performance in the case of the particular material being rolled, instead of with a pressure which merely approximates the optimum pressure for that material. Furthermore, the rolls of the machine would continuously follow the contour of the ground and always apply a constant, preselected pressure thereto regardless of any irregularities in the road surface; also the said pressure control means could positively prevent an overload being applied to the materials being rolled, this being accomplished by selecting an applied pressure for the roll making the initial pass which is below the overload pressure for the material. Hence, it would be impossible for that roll to exert a pressure exceeding the overload pressure. In this connection, it is important to observe that the customary three-axle load transfer action could not operate to cause the roll to apply a pressure greater than the overload pressure for the material since the pressure control mechanism would permit the roll to yield before the overload pressure was reached and thereby avoid application of excessive pressure to the material being compacted.

Thus in my copending application Serial No. 290,183, I provided a road roller of the type having a drive roll and two or more idler rolls arranged in tandem in which the idler rolls could be caused to apply a preselected pressure to the road surface over which the roller was operating; and by reason of my novel pressure control, the initial pass of a roll might be made with the exact pressure desired; also provided a road roller which could be adjusted to prevent an overload being applied to the materials being rolled by setting the pressure control device at a desired maximum pressure; also provided a road roller of the type having three or more rolls arranged in tandem and in which a pressure distribution, other than that determined by the natural function of various combinations of levers in the machine structure, might be preselected.

The principal object of my present invention is to provide a three-axle road roller arranged in tandem which dispenses with the walking beam disclosed in my copending application Serial No. 290,183, but which functions in the same manner to give the same results hereinbefore expressed, both of said steering rolls being mounted in the main frame of the road roller, but either of said steering rolls being adapted to be raised or lowered by means of fluid pressure applied to the king pins of the yokes of said steering rolls; or said rolls being permitted to float freely on the ground surface; also providing means in the nature of mechanical stops for limiting the vertical travel of either the center or the end guide rolls in one direction, while permitting free upward or downward movement of the said guide rolls in the other direction, whereby only a roll on a high spot on a road surface can receive more than normal pressure.

My present invention includes certain novel features of design and combinations of parts, the essential elements of which are set forth in the appended claims, and which will be hereinafter described with reference to the drawings which accompany and form a part of this specification.

In said drawings:

FIG. 2 is a top plan view of the road roller shown in FIG. 1.

FIG. 3 is a schematic view of a three-axle road roller of the type shown in FIG. 1.

FIG. 9 is a view similar to FIGS. 7 and 8 but showing the drive roll surmounting a high spot in the surface being rolled.

FIG. 10 is an enlarged vertical section taken on line 10—10, FIG. 2.

FIG. 11 is a horizontal section on the line 11—11, FIG. 10.

Figure 1:
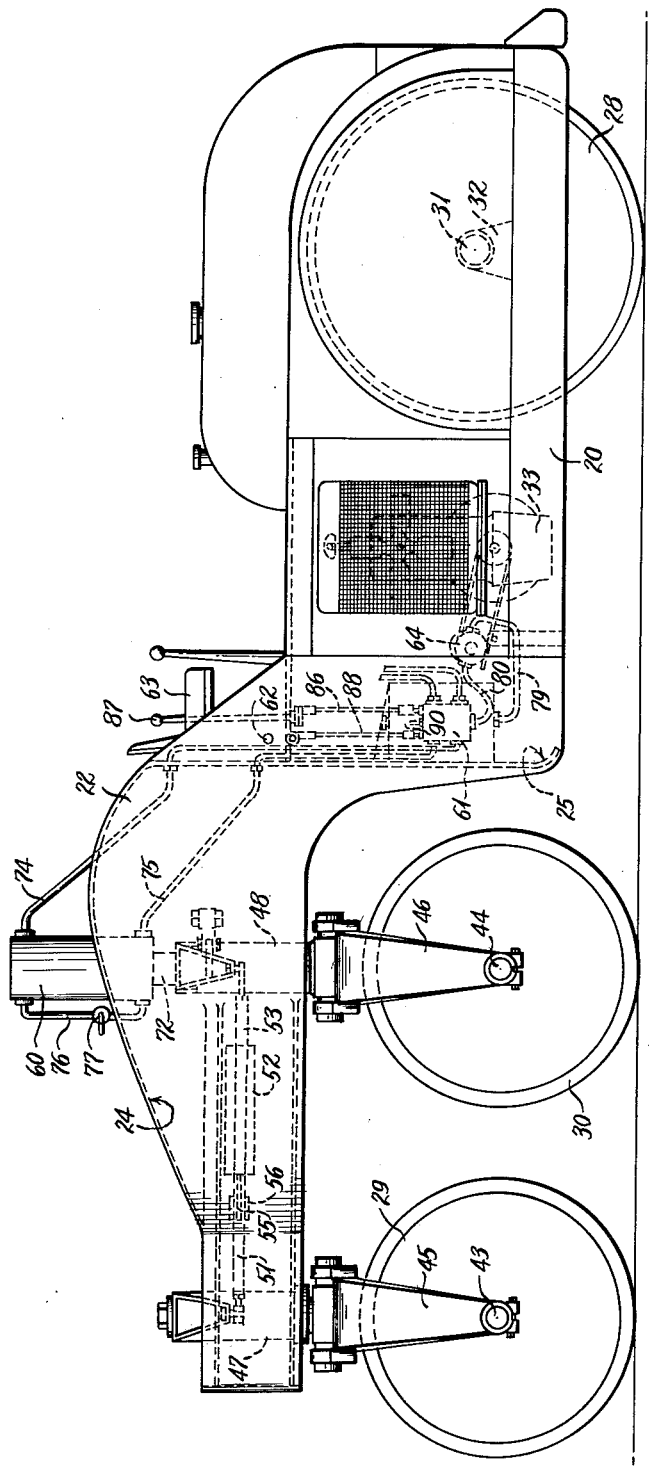
FIGURE 1 is a side elevation of a three-axle tandem road roller incorporating one embodiment of my novel pressure control means.

In FIGS. 1 and 2 of the drawings, I have shown my novel pressure control means as applied to a three-axle tandem road roller. However, my invention may also be applied to other types of road rollers having axles arranged in tandem. The road roller shown in FIGS. 1 and 2 has a frame which includes a pair of spaced side rails 20 and 21 which, at their rear ends, are connected to the lower ends of a pair of arch plates 22 and 23 which are curved upwardly and rearwardly and are connected together along their top edge by a cover plate 24. The forward end of this plate is bent down to form a vertical wall or shield 25 closing the rear end of the roller frame.

The road roller is provided with a drive roll 28 and two guide rolls 29 and 30. The drive roll 28 is journaled on an axle 31 which is supported at either end by brackets 32 supported on the side rails 20 and 21. The drive roll 28 is driven by an engine 33 which is supported between the side rails 20 and 21 and which, through a transmission 34, drives a bevel gear 35 which meshes with a ring gear 36 secured to the adjacent end of drive roll 28.

The guide rolls 29 and 30 are supported by the arch plates 22—23 of the frame, the rolls 29 and 30 being journaled on axles 43 and 44, respectively, which are supported between the arms of their respective steering yokes 45 and 46. The yokes 45 and 46 are provided with king pins 47 and 48, respectively, which turn about vertical axes. The turning of the king pins in the bearings provided therefor is controlled by steering arms 49 and 50 (FIG. 2) which are non-rotatably connected with the king pins 47 and 48, respectively. The outer ends of arms 49 and 50 are connected together by a steering link 51 so as to cause conjoint turning movement of the steering yokes 45 and 46.

The road roller is provided with a power-steering mechanism which includes an hydraulic cylinder 52 (FIG. 2) having a piston rod 53 which is connected to an arm 54 secured to the king pin 48 and the steering arm 50. The closed end of the cylinder 52 is pivoted at 55 on a bracket 56 projecting from the inner side of the arch plate 23. Oil under pressure may be admitted to either end of cylinder 52 by means of fluid pressure lines 57 and 58 which are connected to a hydraulic control valve in a manner to be hereinafter described. Hence, by suitable control of the flow of oil to hydraulic cylinder 52, king pin 48 may be selectively turned in one direction or another in its bearing in the frame. At the same time, coordinated steering of guide roll 29 will be effected by means of connecting link 51 which will cause king pin 47 to be simultaneously rotated in its bearing in the frame.

For the purpose of controlling the pressure applied by the guide rolls 29 and 30 (FIGS. 1 and 2) against the road or ground surface being rolled, I have provided the roller with a novel pressure control means including a double-acting hydraulic cylinder 60, a pressure control valve 61, and a control lever 62 by means of which the operator can control the valve 61 while sitting on the operator's seat 63. Fluid under pressure for operating the hydraulic system of the roller, including the power steering mechanism and the pressure control device, is supplied by a pump 64 which is arranged to be driven from the shaft of engine 33 of the roller.

The cylinder 60 is supported on the frame above king post 48 and is formed integrally therewith or secured thereto in any desired manner. The cylinder is provided with a piston rod 72 which may be an extension of the king post 48. Fluid under pressure may be applied to either end of the cylinder 60 by means of fluid pressure lines 74 and 75 which are communicatively connected with opposite ends of the cylinder and are also connected with the ports of the pressure control valve 61 so as to enable fluid at a predetermined, constant pressure to be admitted to either end of cylinder 60. In this way, a constant pressure may be applied to the king post 48. Hence, by controlling the pressure of the fluid supplied to the cylinder 60, and by selecting the side of the cylinder to which it is to be delivered, the guide roll 30 may be caused to bear with any desired pressure, up to the capacity of the roller, against the surface being rolled.

The cylinder 60 is also provided with a by-pass line 76 which connects the opposite ends of cylinder 60. A cut-off valve 77 is provided in the line 76 so as to enable fluid to be by-passed or not between the opposite ends of cylinder 60 as may be desired. When the valve 77 is opened, oil may flow through the line 76, thereby permitting free, floating action of the king post 48 and hence the guide roll 30. However, when the pressure control means is rendered active, the valve 77 must be closed and prevent oil from flowing through the line 76 so that normal operation of the pressure control means may be effected.

Figure 5:
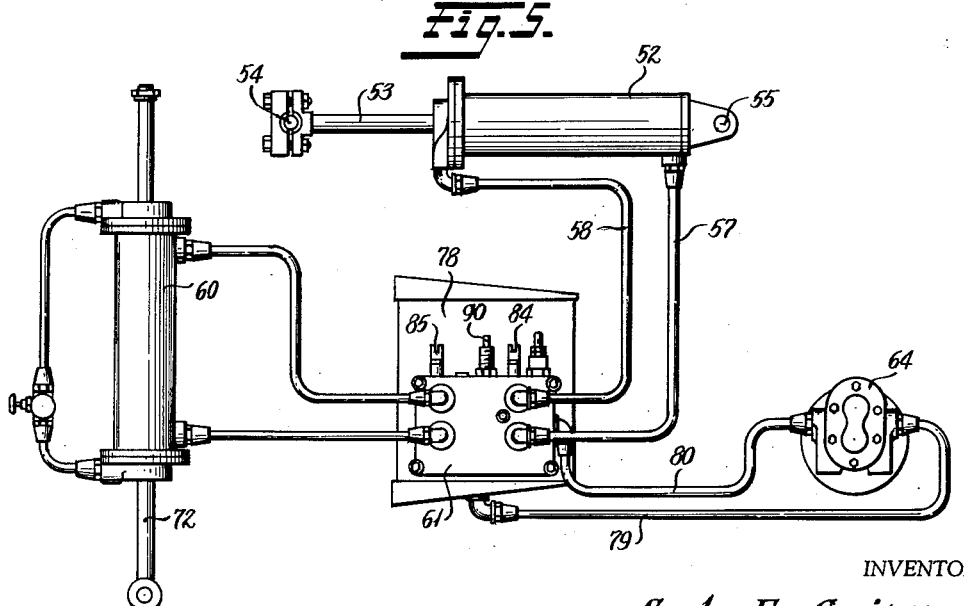
FIG. 5 is a diagrammatic view of the hydraulic system of the road roller shown in FIG. 1 including the pump, pressure control valve, steering cylinder, and pressure control cylinder.

The hydraulic system of the road roller is clearly illustrated in FIG. 5 wherein it will be seen that oil, or other suitable hydraulic fluid, is drawn from the bottom of a sump tank 78 through an oil line 79 connected to the low pressure side of pump 64. The high pressure side of pump 64 is connected by a line 80 with pressure control valve 61. As shown in FIG. 5, this valve is provided with four ports, two of which are connected with the fluid pressure lines 57 and 58 for the power steering cylinder 52, and the other two of which are connected with the fluid pressure lines 74 and 75 for the fluid pressure control cylinder 60.

The valve 61 is provided with two valve spindles 84 and 85 (FIG. 4), the spindle 84 controlling the flow of fluid to the power steering cylinder 52 through either line 57 or 58 depending upon the direction of movement of the spindle. In a similar manner, spindle 85 controls the flow of fluid to the pressure control cylinder 60 through either line 74 or 75 depending upon the direction in which the spindle 85 is moved. The spindle 84 is connected by a link 86 (FIG. 1) with the lower end of a steering lever 87 which is located adjacent the side of the driver's seat 63. The spindle 85 is connected by a link 88 with the lower end of the control lever 62 located, like the steering lever 87, to the side of driver's seat 63. The pressure at which fluid will be delivered to the pressure control cylinder 60 may be determined by a pressure adjusting screw 90 located on top of valve 61.

Figure 4:
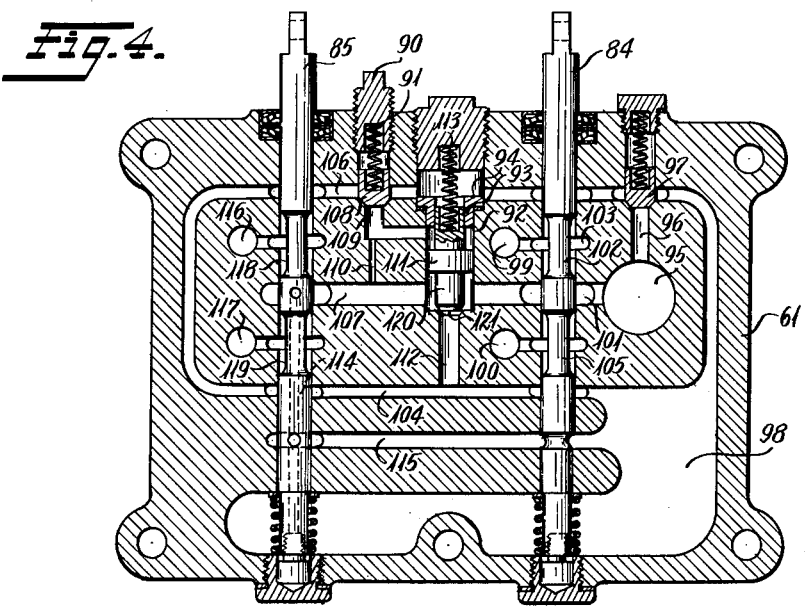
FIG. 4 is a cross-sectional view of the pressure control valve.

An understanding of the operation of the pressure control valve 61 may be best obtained by referring to FIG. 4 of the drawings which shows this valve in cross-section. High pressure oil from pump 64 (FIG. 5) passes through line 80 and into a chamber 95 (FIG. 4) of valve 61. This chamber is communicatively connected by a bore 96 with a master relief valve 97. The setting of the valve 97 determines the maximum pressure at which the system can be operated and, should the pressure in chamber 95 exceed this predetermined pressure, the valve 97 will lift off its seat and permit fluid to escape from the chamber 95 into a low-pressure chamber 98 which is connected with the oil tank 78 and, therefore, is at atmospheric pressure. The flow of high pressure oil from the chamber 95 to either port 99 or port 100, which ports are connected with lines 58 and 57, respectively, for the power-steering cylinder, may be controlled by shifting the spindle 84 up or down. If the spindle 84 is lowered, oil from the chamber 95 may flow through a passageway 101, around the reduced portion 102 of the spindle 84 and through passageway 103 into port 99 and, thence, through line 58 to one end of the power-steering cylinder 52. Oil in the opposite end of the cylinder may escape through line 57 and port 100 which port, when the spindle 84 is lowered, is communicatively connected with a passageway 104 which communicates with the low-pressure chamber 98.

If the spindle 84 is raised, high pressure oil from chamber 95 will pass around the reduced portion 105 of the spindle and into the port 100 which is connected by line 57 to one end of the cylinder 52. Oil in the opposite end of the cylinder may be returned through line 58 to port 99 which, when the spindle 84 is raised, is communicatively connected with a low-pressure passageway 106 which is communicatively connected with the low-pressure chamber 98.

For the purpose of the present invention, it is essential that the oil supplied to the pressure control cylinder 60 be maintained at a constant, predetermined pressure. For this purpose, the valve 61 is provided with a pressure control device whereby the oil in a passageway 107, adjacent the spindle 85, may be maintained at a predetermined constant pressure. This pressure may be adjusted, as desired, by suitable turning of the adjusting screw 90 which, through a spring 91, controls the pressure required to raise a pilot valve 108 off its seat. This valve 108 controls the pressure in a chamber 109 which communicates with the upper side of a pressure regulator piston 111 which is slidably received within a bore 92 provided in the valve body. The piston 111 is provided at its upper end with a stem 93 which is guided in an aperture provided in a bushing 94. The piston is also provided with a downwardly extending stem 120 having a valve seat 121 formed on the bottom thereof. The two sides of the piston 111 are of equal area and both are normally subjected to the same pressure, the pressure on the lower side being communicated to the upper side through a metering orifice 110 and the chamber 109. The piston is, therefore, normally in hydraulic balance and held on its seat by a light spring 113.

Should the pressure in the passageway 107, i.e., the pressure acting on the underside of the piston 111, exceed the pressure setting of the pilot valve 108 as established by spring 91 and adjusting screw 90, valve 108 will be lifted from its seat thereby permitting fluid to flow past the valve 108 and into the low-pressure chamber 98. At the same time, oil will flow through the metering orifice 110 thereby inducing a pressure differential across the orifice so that the pressure on the upper side of piston 111 will now be less than the pressure on the lower side thereof. Hence, the piston will be raised off its seat 121 and oil will flow past the seat 121 and through a bore 112 which communicates with the low-pressure passageway 104. Pressure on the underside of piston 111 will thereby be reduced thus restoring the hydraulic balance of piston 111. Hence, the piston 111 will always assume a position wherein the downward forces acting on the piston are exactly counterbalanced by the upward forces acting thereon, thereby maintaining the piston in equilibrium and the pressure in the passageway 107 constant.

When the spindle 85 is in its neutral or central position as shown in FIG. 4, oil from the passageway 107 will be permitted to flow through the bore 114 extending through the center of the spindle 85 and, thence, through channel 115 to the low-pressure chamber 98. Hence, oil will flow idly through the system and practically no load will be applied to the pump 64. If, however, either valve spindle 84 or 85 is moved from the neutral position shown in FIG. 4, the bore 114 will be cut off from the low pressure chamber 98 and the pressure in the chamber 95 and the passageway 107 will rise to the designated operating pressure for the system.

The valve spindle 85 controls the flow of fluid under constant pressure from the passageway 107 to either of the ports 116 or 117 in the same manner as the control of fluid from the passageway 101 is controlled to the ports 99 and 100 by the spindle 84. That is, when the spindle 85 is lowered, fluid under pressure from passageway 107 may flow around the reduced portion 118 of the spindle 85 and into the port 116 which is connected by line 74 with one end of the pressure control cylinder 60. Oil in the opposite end of cylinder 60 may return through line 75 to the port 117 which, when the spindle is lowered, will be communicatively connected with the low-pressure channel 104. In like manner, when the spindle 85 is raised, high pressure oil from the passageway 107 may flow around the reduced portion 119 of the spindle and through port 117 and line 85 to one end of the cylinder 60. Oil from the opposite end of the cylinder may return through line 74 to port 116 which, when the spindle 85 is raised, will be communicatively connected with the low-pressure channel 106.

From the foregoing description it will be seen that by suitable adjustment of the pressure adjusting screw 90 (FIG. 4), a predetermined, constant pressure may be applied by the cylinder 60 to the king post 48. It will also be seen that this pressure may be applied in either direction by raising or lowering the valve spindle 85. Hence, the force applied by the center guide roll 30 to the surface being rolled may be adjusted and this selected loading on the roll 30 will be maintained constant throughout the rolling operation performed by the road roller.

Through the functioning of the valve 61 previously described, the pressure in the hydraulic system may be adjusted so that any weight ratio between guide rolls 29 and 30 and drive roll 28 may be selectively achieved and maintained, said rolls following the contour of the ground over which the roller is operating.

As shown in FIG. 1, my pressure control means as above stated is applied to the center guide roll 30 of a three-axle road roller while the leading guide roll 29 is mounted in the conventional manner in the roller frame so that it may swivel about a vertical axis, but will be held against vertical displacement. As shown in FIG. 1, the center guide roll 30 is carried by a steering yoke having a king pin 48 which is mounted for vertical sliding movement relative to the frame of the roller. The king pin 48 is connected to the piston of hydraulic cylinder 60 secured to the frame of the roller. By supplying fluid under pressure through a line 74 to the upper end of the cylinder 60, and returning the fluid from the lower end of the cylinder 60 through line 75, the center guide roll 30 may be urged downwardly so as to bear with increased pressure against the surface being rolled. Fluid under pressure may be supplied from the oil pump 64 supplying oil under pressure to the pressure control valve 61, which as previously explained, permits oil, under a constant predetermined pressure to be supplied to either end of the pressure control cylinder. In the construction shown in FIG. 1, there would seem to be no occasion for supplying oil under pressure to the lower end of the cylinder 60 unless it be for the purpose of lifting the roll 30 clear off the ground so as to cause the roller to operate as a two-axle tandem. If desired, of course, the roll 30 could be permitted to float freely on the ground by positioning the valve spindle 85 in its neutral position and opening cut-off valve 77 so as to permit oil to flow between the upper and lower ends of the cylinder 60 through shunt line 76.

When fluid under a predetermined, constant pressure is supplied through the line 74 to the upper end of the cylinder 60, the roll 30 will be urged downwardly against the surface being rolled with a constant pressure, and a predetermined distribution of weight between the guide rolls 29 and 30 will be effected. Of course, the greater the pressure applied to the cylinder 60, the greater will be the proportion of the weight carried by the roll 30 until the point is reached where the roll 29 will carry little or no weight while the roll 30 will carry practically all of the weight; and the ratio of the weight carried by the rolls 29 and 30 will be maintained constant even though the roller is operating over uneven ground. This is due to the fact that the downward pressure applied to the roll 30 will be maintained constant and uniform regardless of vertical positioning of this roll as it travels over the ground.

Figure 7:
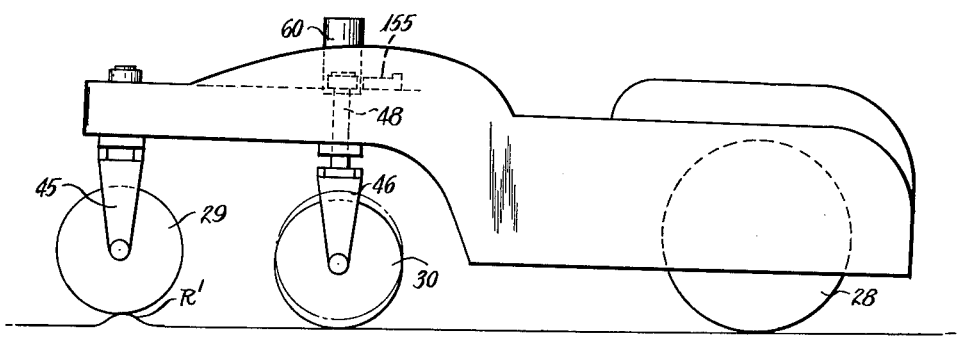
FIG. 7 is a schematic view of the roller shown in FIG. 1 in which the end guide roll is shown surmounting a high spot in the surface being rolled.
Figure 8:
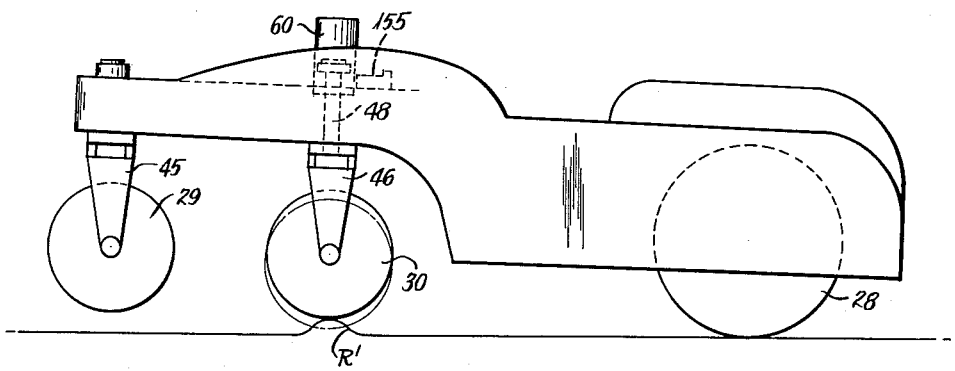
FIG. 8 is a view similar to FIG. 7 showing the center guide roll surmounting a high spot in the surface being rolled.
Figure 12:
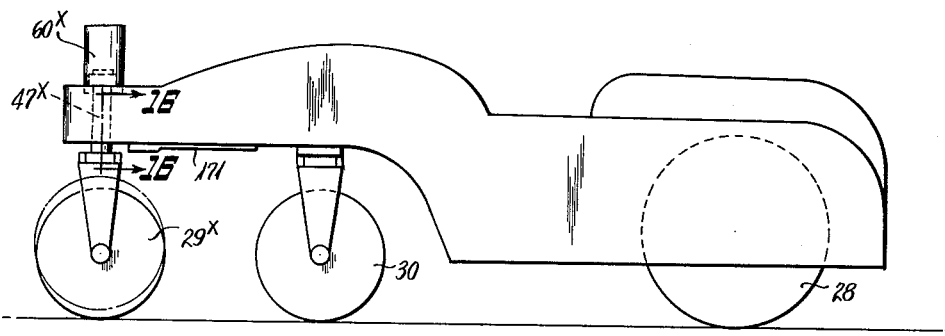
FIG. 12 is a schematic view showing the end guide roll arranged for vertical flotation.

The ability of the three-axel tandem road roller shown in FIGS. 1 and 2 to follow the contour of the surface being rolled, is illustrated in FIGS. 7, 8 and 9. Let it be assumed that the road roller is moving toward the left in each of these three views, and also that oil at a predetermined, constant pressure is being supplied through the line 74 to the upper end of the pressure control cylinder 60. Let it further be assumed that the pressure of the fluid flowing into the upper end of the cylinder 60 is such as to cause the roll 30 to bear against the road surface with a constant pressure which is twice as great as that with which the leading guide roll 29 bears against the road surface.

Assume now that the leading guide roll 29 encounters a high spot R' in the road as shown in FIG. 7. As the road roller moves to the left the roll 29 will surmount the high spot R'. The pressure control cylinder 60 will still exert a constant downward pressure on the king pin 48 and hence the pressure control means will continue to cause the center guide roll 30 to bear against the road surface with a pressure equal to twice the pressure with which the leading guide roll 29 bears against the road surface, as long as roll 30 remains in contact with the ground.

Assume now that the road roller continues to move towards the left until the guide roll 30 surmounts the high spot R' as shown in FIG. 8. When this occurs the king post 48 will be moved upwardly to the new position shown in FIG. 8 and the piston in cylinder 60 will be moved upwardly against the resistance of the oil under pressure supplied to the upper end of the cylinder 60. The pressure applied by the cylinder 60 to the king post 48 will, however, remain constant so that in the moved position of the post 48, shown in FIG. 8, the pressure control means will still cause the center guide roll 30 to bear against the road surface with a pressure which is up to twice as great as the pressure normally applied by the roll 29 against the road surface until the end guide roll 29 is lifted clear of the road surface as shown in FIG. 8.

As the road roller continues to move toward the left, it finally reaches a point where the drive roll 28 surmounts the high spot R', as shown in FIG. 9. However, the pressure control means will continue to apply a constant downward pressure to the king post 48 so that the center guide roll 30 will continue to apply a pressure against the road surface which is twice as great as the pressure normally applied by the leading guide roll 29. Hence, it will be seen that the rolls of the road roller always will follow the contour of the surface being rolled and the ratio of the applied pressures of the guide rolls against the surface being rolled always will remain constant despite irregularities in the surface over which the roller travels.

In the foregoing example of the operation of the pressure control means when the roller is operating over an irregular surface in the manner illustrated in FIGS. 7, 8 and 9, it will be understood that any desired ratio of applied pressures of the rolls 29 and 30 could be selected in the place of the particular one chosen here for purposes of illustration. For example, by positioning the valve spindle 85 in its neutral position and opening the cut-off valve 77 so as to permit free oil flow between opposite ends of the cylinder 60 through the shunt line 76, the center guide roll 30 will be caused to float upon the road surface. If, now, valve 77 is closed and fluid under pressure is admitted to the upper end of the cylinder 60, the roll 30 will take on an increased share of the weight of the roller while the roll 29 will assume a smaller share of the weight. If the pressure applied to the upper end of the cylinder 60 be sufficiently great, the end guide roll 29 will be lifted entirely off the ground so that the center guide roll 30 will carry the entire weight of the forward end of the roller. This situation may be reversed, of course, by applying oil under pressure to the lower end of the cylinder 60, after closing the cut-off valve 77, so that the end guide roll 29 will assume a greater portion of the weight than the center guide roll 30. The ratio of the weight carried by the two guide rolls 29 and 30 will depend, of course, on the pressure of the fluid supplied to the lower end of the pressure control cylinder 60. If this pressure be great enough, the center guide roll 30 will be lifted clear of the ground and the end guide roll 29 will carry all of the weight of the forward end of the roller.

While the type of road roller illustrated in FIGS. 1 and 2 is admirably suited for use in connection with my pressure control means, it is to be realized that my invention could be applied with equal facility to other types of road rollers having three or more axles arranged in tandem.

FIGS. 12, 13, 14 and 15 show a modification in which the fluid pressure cylinder for vertically raising and lowering a guide roll is applied to the end guide roll rather than to the center guide roll.

As shown in FIGS. 12 to 15 inclusive, the fluid pressure cylinder 60x is applied to the king post 47x of the end guide roll, which king post is slidably mounted in the trunnions of the vertically slidably mounted front guide roll 29x. However, the construction of the cylinder 60x is generally similar to the construction and arrangement of the cylinder 60 as above described with respect to the center guide roll 30 shown in FIGS. 6 to 9 inclusive, the cylinder 60x being supplied with fluid under pressure to the upper end by pipe line 74 or to the lower end through pipe line 75 as in the preceding figures.

According to FIGS. 12 to 15 inclusive, when fluid under a predetermined constant pressure is supplied through pipe line 74 to the upper end of cylinder 60x, the roll 29x will be urged downwardly against the surface being rolled by a constant pressure and a predetermined distribution of weight between the guide rolls 29x and 30 will be effected. The greater the pressure applied to the cylinder 60x the greater will be the proportion of the weight carried by the end guide roll 29x until the point is reached where the center guide roll 30 will carry little or no weight while the end guide roll 29x will carry practically all of the weight and the ratio of the weight carried by the rolls 29x and 30 will be maintained constant or even though the road roller is operating over uneven ground. This is due to the fact that the downward pressure applied to the end guide roll 29x will be maintained constant and uniform regardless of vertical positioning of the center guide roll 30 as it travels over the ground.

Let it be assumed that the road roller is moving toward the left in each of the FIGURES 12 to 15 inclusive and also that oil at a predetermined constant pressure is being supplied through the line 74 to the upper end of the pressure control cylinder 60x. Let it be further assumed that the pressure of the fluid flowing into the upper end of cylinder 60x is such as to cause the roll 29x to bear against the road surface with a constant pressure which is twice as great as that with which the center guide roll 30 bears against the roll surface.

Figure 13:
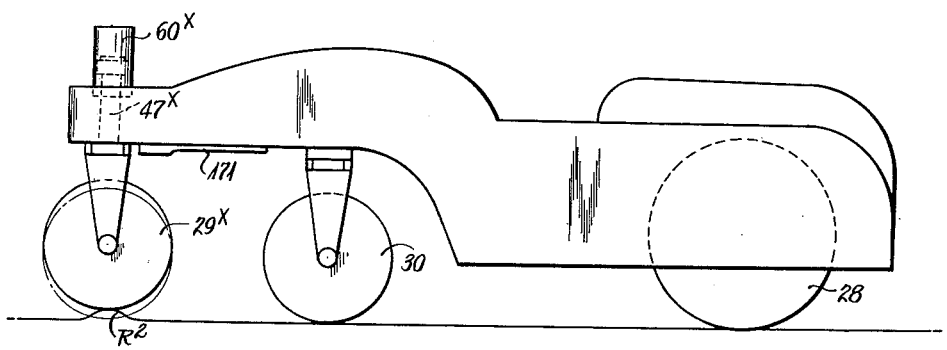
FIG. 13 is a schematic view similar to FIG. 12 showing the end guide roll surmounting a high spot in the surface being rolled.

Assume now that the end guide roll 29x encounters a high spot R2 in the road surface as shown in FIG. 13. As the road roller moves to the left, FIG. 13, the roll 29x will surmount the high spot R2. The pressure control cylinder 60x will still exert a constant downward pressure on the king pin 47x and hence the pressure control means will continue to cause the roll 29x to bear against the road surface with a pressure equal to twice the pressure with which the center guide roll 30 bears against the road surface.

Figure 14:
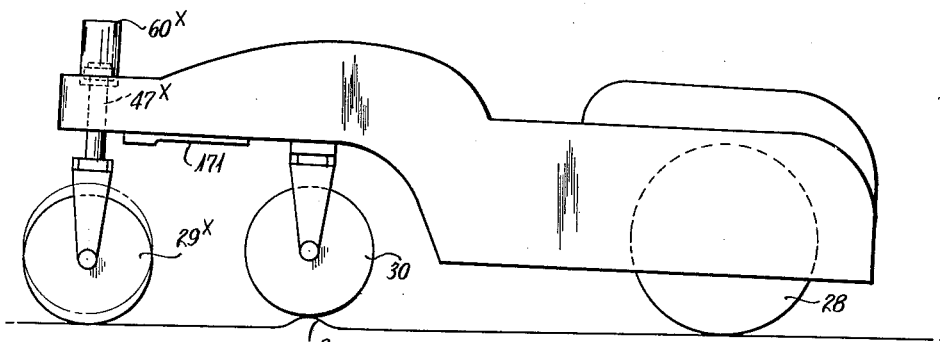
FIGS. 14 and 14A are schematic views similar to FIG. 12 showing the center guide roll surmounting a high spot in the surface to be rolled.
Figure 14A:
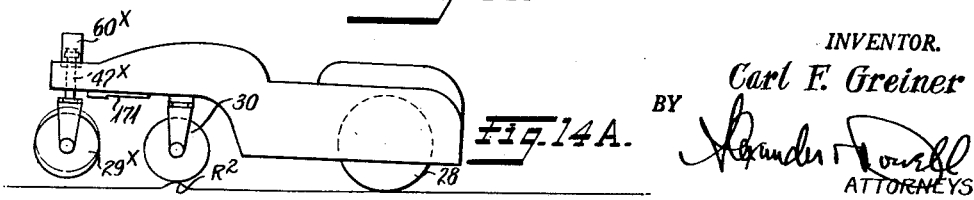

Assume now that the road roller continues to move toward the left until the center guide roll 30 surmounts the high spot R2 as shown in FIG. 14. When this occurs the king post 47x and the piston in cylinder 60x will move upwardly against the resistance of the oil under pressure supplied to the upper end of cylinder 60x. The pressure applied by the cylinder 60x to the king post 47x, however, remains constant so that in the moved position of the king post 47x shown in FIG. 14, the pressure control means will still cause the guide roll 29x to bear against the road surface with a pressure which is twice as great as the pressure normally applied by the center guide roll 30 against the road surface, although in this position the center guide roll 30 may be lifted clear of the road surface.

Figure 15:
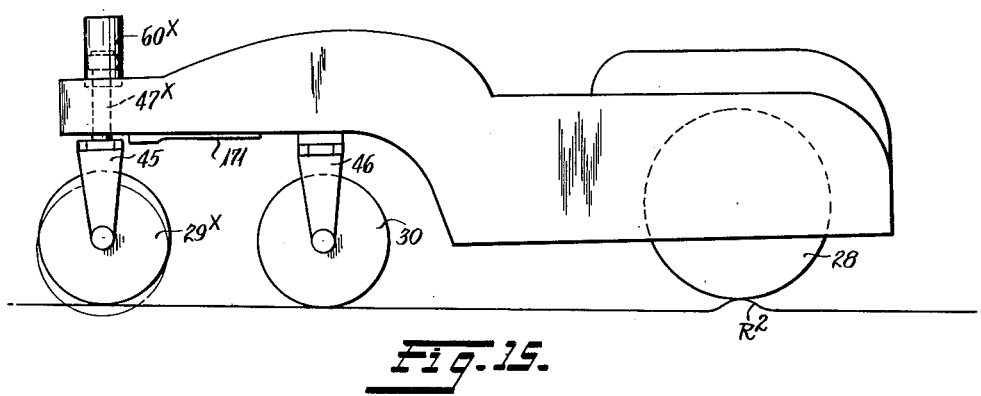
FIG. 15 is a schematic view similar to FIG. 12 showing the drive roll surmounting a high spot in the surface to be rolled.

As the road roller continues to move toward the left it finally reaches a point where the drive roll 28 surmounts the high spot R2 as shown in FIG. 15. However, the pressure control means will continue to apply a constant pressure to the king post 47x so that the end guide roll 29x will continue to apply pressure against the road surface which is twice as great as the pressure normally applied by the center guide roll 30. Hence it will be seen that the rolls of the road roller will always follow the contour of the surface being rolled, and the ratio of the applied pressures of the rolls against the surface being rolled will always remain constant despite irregularities in the surface over which the roller travels.

In the foregoing example of the operation of the pressure control means when the roller is operating over an irregular surface in the manner illustrated in FIGS. 12 to 15, it will be understood that any desired ratio of applied pressures of the rolls 29x and 30 could be selected in place of the particular one chosen here for purposes of illustration. For example, by positioning the valve spindle 85 in its neutral position and opening the cut-off valve 77 so as to permit free oil flow between the opposite ends of the cylinder 60x through the shunt line 76 (as in FIG. 1), the roll 29x will be caused to float upon the road surface. If, now, valve 77 is closed and fluid under pressure is admitted to the upper end of the cylinder 60x, the roll 29x will take on an increased share of the weight of the roller while the roll 30 will assume a smaller share of the weight. If the pressure applied to the upper end of cylinder 60x is sufficiently great, the roll 30 may be lifted entirely off the ground so that the roll 29x will carry the entire weight of the forward end of the roller. This situation, however, may be reversed of course by applying oil under pressure to the lower end of the cylinder 60x after closing the cut-off valve 77, so that the center guide roll 30 will assume a greater portion of the weight than the end guide roll 29x. The ratio of the weight carried by the two guide rolls 29x and 30 will depend of course upon the pressure of the fluid supplied to the lower end of the pressure control 60x. If this pressure be great enough the roll 29x will be lifted clear of the ground and the roll 30 will carry all of the weight of the forward end of the roller.

In connection with the sliding king posts 47 and 48 shown in the preceding figures which are adapted for vertical flotation, I provide mechanical locks associated with the respective king posts 47x and 48 to positively limit the upward movement of the king post 48 of the center guide roll, and/or to positively limit the downward movement of the king post 47x of the end guide roll, whereby upward movement of the center guide roll 30 from a position where the lower peripheries of all three rolls were tangent to a common plane, would be prevented but free downward movement permitted; also whereby downward movement of the end guide roll 29x would be prevented but free upwardly movement thereof permitted. In machines embodying this general structure if the mechanical stops were properly set, only the center guide roll 30 would be permitted to apply more than normal pressure on an elevated portion of the roadway.

Figure 6:
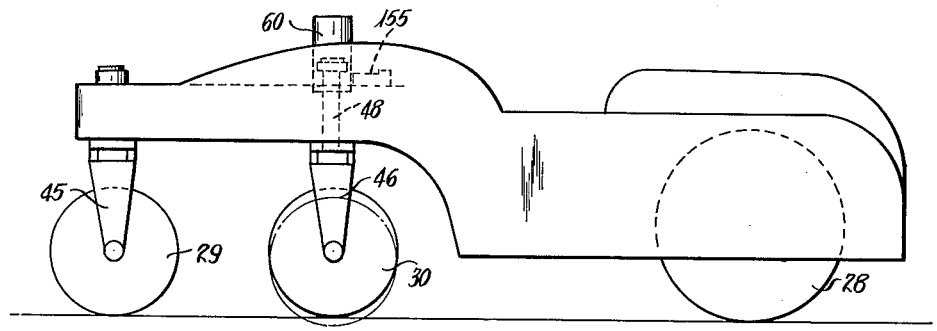
FIG. 6 is a schematic view of the roller shown in FIG. 1 in which the drive roll and both steering rolls have their lower peripheries tangent to a common plane, and showing in dotted lines the center guide roll positioned below said common plane.

With respect to the center guide roll 30 and with reference ot FIGS. 10 and 11, the king post 48 is shown as vertically slidably mounted in trunnion 150 in the frame of the road roller, said king post carrying the yoke 46 for the center guide roll 30; and FIGS. 6, 7 and 8 illustrate the action of the machine when the center guide roll is released for free downward movement, but is restrained from upward movement beyond a point where the lower peripheries of all three rolls 29, 30 and 28 are tangent to a common plane.

As shown in FIG. 7, the end guide roll 29 has encountered and surmounted an elevated portion R' of the road surface, and it will be noted that the center guide roll 30 has retained contact with the ground and thus the end guide roll 29 has therefore not applied more than normal pressure to the elevated portion of the road surface. Likewise, drive roll 28 has not applied more than normal pressure.

In FIG. 8, assuming that the normal pressure applied by the end guide roll 29 in FIG. 7 has not completely reduced the high spot in the road surface and the machine has traveled a sufficient distance for the center guide roll 30 to encounter the high spot, the center guide roll 30 will have moved vertically in its mounting to the upper limit of permitted travel and has surmounted the high spot. In so doing, the end guide roll 29, FIG. 8, has been lifted from the road surface and extra weight is carried by the center guide roll 30, thus applying greater than normal pressure on the elevated portion R', FIG. 8, of the road surface. It is to be noted in this illustration that the weight carried by the drive roll 28 has been reduced and the pressure applied by it correspondingly reduced. Consequently only the elevated portion R' of the road surface under the center guide roll 30 receives more than normal pressure.

From the foregoing it will be seen that more than normal pressures have been applied only to elevated portions of the road surface, and that consequently no depressions have been created in the road surface by any roll not positioned on a high spot applying more than normal pressures.

In FIGS. 10 and 11 one form of mechanical lock is provided permitting free downward movement only of the center guide roll 30. In these figures the king post head 151 carries a yoke swivel pin 152 while at the upper end of king post 48 the steering arm 54 is retained by washer 153 and a cap screw 154. A manually operated locking lever 155 is pivoted on a stud 156 mounted in the road roller frame, the unlocked position of lever 155 being indicated by broken lines in FIG. 11. When the locking lever 155 is in the locked position shown in FIG. 10, and in full lines in FIG. 11, no upward vertical travel of the center guide roll 30 is possible and the machine operates the same as the original three-axle road roller disclosed in Greiner Patent No. 2,029,659 and Trembly Patent No. 2,132,059. When, however, the locking lever 155 is in the unlocked position shown in dot-and-dash lines in FIG. 11, the king post 48 carrying the center guide roll 30 may slide downwardly through its journals in the trunnion 150 until the thrust surface 157 contacts the thrust surface 158, FIG. 10. In so doing, the lower periphery of center guide roll 30 will be positioned below the plane tangent to the lower peripheries of the end guide roll 29 and the drive roll 28, the locking lever 155 being manually controlled through linkage 159 accessible from the operator's seat of the road roller. This provides for the relative positions of the guide rolls as shown in FIGS. 6, 7, 8 and 9. When the center guide roll 30 encounters a high spot the king post 48 slides upwardly through its journals until the thrust surface 160, FIG. 10, engages the underside of the bushing 162, and in this position the lower peripheries of all the three rolls are tangent to a common plane and the action illustrated in FIG. 6 prevails.

In FIGS. 12 to 15 the mechanical lock is shown as applied to the end guide roll rather than to the center guide roll. However, the action of the mechanical lock is substantially the same as that described in connection with FIGS. 10 and 11. In this modification, the mechanical lock is shown more specifically in FIGS. 15, 16, 17 and 18. In FIGS. 15 to 18 the king posts 47x is slidably mounted in trunnions 170 mounted in the main frame of the road roller so as to be adapted for vertical movement or flotation. As is illustrated, end guide rolls 29x may be released for free upward movement but restrained from free downward movement beyond a point where the lower peripheries of all three rolls are tangent to a common plane. The same effect is obtained as described in conjunction with FIGS. 10 and 11, and the action can be traced through the various positions to achieve the same result wherein only a roll on a high spot in the road surface receives more than normal pressure. Likewise, the only roll applying more than normal pressure is the center guide roll 30 and such action occurs only when said roll encounters and surmounts a high spot in the road surface.

Figure 18:
FIG. 18 is a section on the line 18—18, FIG. 16.
Figure 16:
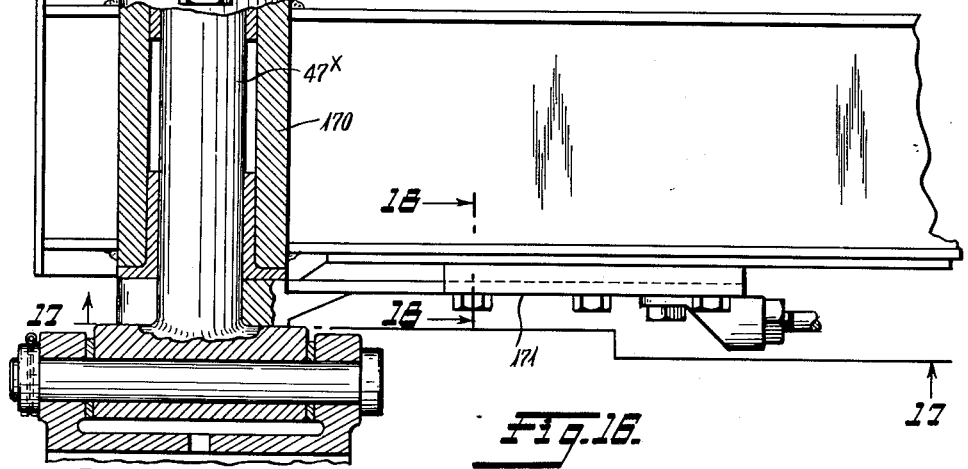
FIG. 16 is an enlarged vertical section on the line 16—16, FIG. 12.
Figure 17:
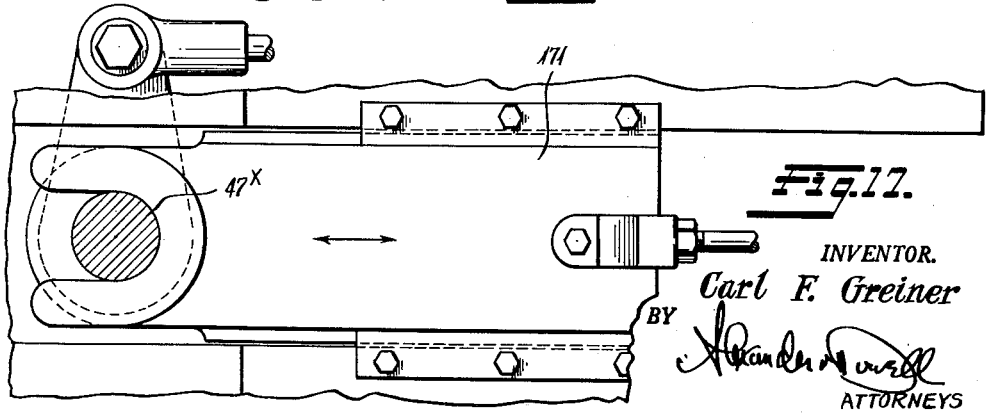
FIG. 17 is a horizontal section on the line 17—17, FIG. 16.

In FIGS. 16 to 18 a manually operated slide 171 is provided which in the unlocked position permits upward movement of the end guide roll 29x from a point where the lower peripheries of all of the rolls are tangent to a common plane but does not provide downward movement of the end guide roll from such position. When the slide 171 is in locked position no vertical travel of the king post 47x for the end guide roll 29 in relation to the other rolls is possible. In the prior art, both Greiner No. 2,029,659 and Trembly No. 2,132,059 provide for vertical movement of one of the guide rolls with respect to the other rolls, but in neither patent, however, was the objective or functional result the same as my present disclosure, since neither Greiner nor Trembly provided a three-axle structure wherein the application of more than normal pressures in any roll in a three-axle roller was limited to the roll surmounting a high spot in the road surface.

I claim:

1. A self-propelled road roller comprising a frame; a drive roll and a plurality of guide rolls arranged in tandem on said frame; an engine in the frame disposed adjacent said drive roll; means for driving the drive roll from said engine; means for supporting one of said guide rolls in said frame for vertical displacement relative to the other rolls; means connected between said frame and said supporting means for applying a downward pressure on said one guide roll in opposition to the reaction force exerted thereon by the surface being rolled, including a fluid line and a pump; and means for adjusting said pressure applying means to control the downward pressure exerted thereby on said one guide roll while maintaining steering and driving contact with the ground surface, said adjusting means comprising a hydraulic piston for applying a constant pressure on said one guide roll, a pressure control means in the fluid line between the pump and piston having a low pressure chamber therein, and an adjustable spring loaded pressure control valve to automatically open and close the passageway to said low pressure chamber at predetermined pressures to relieve overload pressures in the piston supply line and to maintain said pressure at a predetermined constant, whereby the proportion of the total weight of the roller carried by said one guide roll may be selected as desired and maintained constant during rolling operations.

2. In a road roller as set forth in claim 1, said one guide roll being an intermediate guide roll disposed adjacent the drive roll.

3. In a road roller as set forth in claim 1, said one guide roll being the end guide roll remote from the drive roll.

4. A self-propelled road roller comprising a frame; a drive roll mounted on one end of said frame; an engine in said frame disposed adjacent said drive roll; means for driving the drive roll from said engine; a plurality of steering yokes swively mounted on the other end of said frame on vertical axes; a guide roll rotatably supported in each steering yoke for rotation about a horizontal axis; steering connections for swiveling all of said yokes in unison to effect coordinated steering of the roller by said guide rolls; means in said frame for supporting one of said steering yokes for vertical displacement relative to the other rolls; means connected between said frame and said supporting means for applying a downward pressure on said one steering yoke in opposition to the reaction force exerted on the guide roll supported thereby by the surface being roller, including a fluid line and a pump; and means for adjusting said pressure applying means to control the downward pressure exerted thereby on said one steering yoke, said adjusting means comprising an hydraulic piston for applying a constant pressure on said one steering yoke, a pressure control means in the fluid line between the pump and piston having a low pressure chamber therein, and an adjustable spring loaded pressure control valve to automatically open and close the passageway to said low pressure chamber at predetermined pressures to relieve overload pressures in the piston supply line and to maintain said pressure at a predetermined constant, while maintaining steering and driving contact with the ground surface, whereby the proportion of the total weight of the roller carried by the guide roll on said one steering yoke may be selected as desired and maintained constant during rolling operations.

5. In a road roller as set forth in claim 4, said one steering yoke being an intermediate yoke disposed adjacent the drive roll.

6. In a road roller as set forth in claim 4, said one steering yoke being the end steering yoke remote from the drive roll.

7. A self-propelled road roller comprising a frame; a drive roll and a pair of guide rolls arranged in tandem on said frame; an engine in the frame disposed adjacent said drive roll; means for driving the drive roll from said engine; means in said frame for supporting one of said guide rolls for vertical sliding movement on said frame; means connected between said frame and said supporting means for applying a downward pressure on said one guide roll in opposition to the reaction force exerted thereon by the surface being rolled, including a fluid line and a pump; and means for adjusting said pressure applying means to control the downward pressure exerted thereby on said one guide roll while maintaining steering and driving contact with the ground surface, said adjusting means comprising an hydraulic piston for applying a constant pressure on said one guide roll, a pressure control means in the fluid line between the pump and piston having a low pressure chamber therein, and an adjustable spring loaded pressure control valve to automatically open and close the passageway to said low pressure chamber at predetermined pressures to relieve overload pressures in the piston supply line and to maintain said pressure at a predetermined constant, whereby the proportion of the total weight of the roller carried by said one guide roll may be selected as desired and maintained constant during rolling operations.

8. In a road roller as set forth in claim 7, said one guide roll being the center guide roll adjacent the drive roll.

9. In a road roller as set forth in claim 7, said one guide roll being the end guide roll remote from the drive roll.

10. In a road roller as set forth in claim 7, stop means on said frame and on said guide roll support, said one guide roll being the center guide roll adjacent the drive roll and a manually operable mechanical stop means movably mounted on the frame adapted to engage the support for said one guide roll whereby when the stop is disengaged the support will engage the stop on the frame to prevent upward movement of the one said guide roll from a position wherein the lower peripheries of all three rolls are tangent to a common plane is prevented while permitting free downward movement thereof.

11. In a road roller as set forth in claim 7, stop means on said frame and on said guide roll support, said one guide roll being the end guide roll remote from the drive roll and a manually operable mechanical stop means movably mounted on the frame adapted to engage the support for said end guide roll whereby when the stop is disengaged the support will engage the stop on the frame to prevent downward movement of said end guide roll from a position wherein the lower peripheries of all three rolls are tangent to a common plane is prevented while permitting free upward movement thereof.

References Cited in the file of this patent
UNITED STATES PATENTS

| | | |
|---|---|---|
| 2,089,591 | Aitken | Aug. 10, 1937 |
| 2,127,485 | Owens et al. | Aug. 16, 1938 |
| 2,132,059 | Trembly | Oct. 4, 1938 |